3,033,806
PREPARATION OF SHAPED EXPANDED THERMOPLASTIC POLYMER
Frank R. Spencer, Stamford, Conn., assignor to American Cyanamid Company, New York, N.Y., a corporation of Maine
No Drawing. Filed Nov. 17, 1958, Ser. No. 774,094
5 Claims. (Cl. 260—2.5)

This invention relates to the production of molded cellular masses from synthetic thermoplastic polymers. More particularly, the present invention relates to the preparation of thermoplastic foam material of improved uniformity in cell structure from vinyl aromatic polymers utilizing a single expansion step.

Although a number of methods have been employed in the past for the production of molded cellular masses, each of these prior methods suffers from certain disadvantages, either in quality of product obtained or because of cumbersome and uneconomical procedural steps. For example, although procedures are available for the production of thermoplastic foamed structures having fairly uniform cells by a two-step procedure, the processing and the initial pre-expansion of the material require accurate control, is unduly time consuming and expensive. Such two-step processes entail the heating and pre-expansion treatment of the thermoplastic particles containing an expanding agent, a subsequent filling of a mold with this partially expanded material, and a further heating and expansion step. The initial heating and expansion must be carefully regulated if a well-knit uniform integral product from the second expansion step is to be obtained.

In prior attempts to produce molded foams by a single heating and expansion step wherein the mold is partially filled with unexpanded discrete granules containing expanding agent, the product has been definitely inferior. When that procedure is used the cross-sectional structure shows a distinctly denser structure at the lower part of the molded piece where the expandable material is placed in the mold and forms overlapping folds of denser material as the polymer expands. In fact, the product frequently contains substantial portions of hard, relatively unexpanded particles in the lower sections while the upper sections have a disproportionately sparse structure in which the cells are relatively over expanded. The product thus produced by a single expansion in the past was not only lacking acceptable physical appearance when the material is employed in exposed structures, but is moreover unusuable for many applications requiring a structure of a substantially uniform or balanced density. In addition, the concentration of expandable material at the bottom of the mold exerts unnecessary force on the walls of the mold. Moreover, in the past it has generally been possible to expand only vinyl aromatic polymeric material having a particle size not exceeding about 5 millimeters in diameter.

According to the present invention, I have found that by providing the expandable thermoplastic material in a bulky form, e.g., excelsior-like or vermiform stringy material, such that when the mold is filled, the material does not accumulate at the bottom of the mold but is uniformly distributed throughout the volume thereof, a high order of uniformity is obtained in the product upon expansion thereof.

It is an object of the present invention to provide a one-step or single expansion procedure for making molded cellular thermoplastic shapes of low, uniform density. It is a further object of the invention to provide a method for making shapes of foam material having cross sections of uniform density throughout. Other objects and advantages will become apparent as the description of the invention proceeds.

The procedure of the invention broadly comprises heating in a shaping apparatus relatively bulky thermoplastic discrete particles containing minor amounts of one or more of various known and available expanding agents including volatile organic liquids or solid blowing agents. The material containing the expanding agent is then expanded under heat to form an integral cellular unit conforming to the size and shape of a mold or other confining apparatus. The essential feature in preparing the foamed shape resides in the provision of the non-expanded impregnated thermoplastic in a bulky or non-compacting form. The physical forms contemplated for the expandable material comprise any of a variety of suitable particle shapes which do not lend themselves to close or dense packing. As such, for example, may be stringy or vermiform particles of material prepared according to the procedure described in the copending application, Serial No. 737,759, filed May 26, 1958, now abandoned. Helices, stars, cylinders, saddles, tori, excelsior-like particles, corrugated sheets and a variety of other bulky material forms may be extruded or otherwise prepared, so that the material to be expanded is bulky in form and fairly evenly distributed over the whole volume of the shaping apparatus which the foamed shape is desired to occupy. The shaping apparatus as this term is utilized includes not only molds but any apparatus having confining walls including cubes; parallel wire belts or conveyors for continuous formation of slabs; or sandwich sheets employed in fabricating laminated structures, for example.

The invention contemplates filling the shaping apparatus with the expandable thermoplastic polymer having a bulk density not greater than that of the finished foam shape. The bulk density of the expandable material may be as low as 0.5 pound per cubic foot. Within the concept of the invention, it will be apparent that if the bulk density of the material to be expanded is less than the density desired for the foamed product, the bulky expandable material may be compressed in the shaping apparatus to the desired density. It will be understood that the invention is specifically concerned with the condition of non-expanded polymer and it is a requisite of the present invention that the bulk density of the expandable synthetic thermoplastic material be not higher than that of the shaped foam product. It is only when the material to be expanded is well distributed within the volume of the mold that a shaped product substantially free of folds and pockets, which are formed from the gradual eruption of material concentrated at the bottom of the mold, is obtained. Another way of expressing the bulk density of the material in the form contemplated by the invention, in addition to the numerical bulk density, is by way of ratio between solid and void space in the bulky material. Thus, the ratio of voids to non-expanded solid material should be at least 5:1 and may be as high as 120:1. For most general applications, the ratio of voids in the mold to expandable impregnated polymer is from about 6:1 to about 62:1.

Temperatures suitable for expansion of the polymer may vary from about 90° C. to about 150° C. although in most instances temperatures up to about 140° C. are adequate. Various sources of heat may be applied to the material directly or indirectly upon the shaping apparatus; suitable sources being such as steam or infra-red heat, for example.

The present invention makes possible the production of foamed shapes of unusually high uniform cross-sectional structure not heretofore attainable by a single expansion step. The foamed material may be produced so as to have a density as low as 0.5 pound per cubic foot while having remarkable uniformity of density. The invention further provides a means for the production of cellular products of predetermined density. As noted herein-above, the density of the cellular products may be in general regulated by controlling the amount of bulky charge introduced into the mold. For example, it is apparent that a mold containing the excelsior-like charge of expandable polymer although filled may be further compressed to admit additional material where a greater density in the foam product is desired. The density of the foam is also regulated by varying the amount or character of the expanding agent incorporated in the polymer.

Because of the low specific gravity of the foamed shapes prepared according to the invention, the material advantageously lends itself for a variety of purposes, e.g., as an insulating material for refrigerators or in buildings, for example. It may likewise be employed for sound insulation; to provide buoyancy as in life belts or boat compartments; or to provide both buoyancy and strength when used as a filler in vacant sections in the structure of aircraft, for example.

Any one or more suitable expanding agents which are available and recognized as such by those skilled in the art and which have a gasifying temperature below the softening point of the polymer may be utilized. Expanding agents as contemplated herein may be solid or liquid compounds, including monomers or polymers which form a gas when heated above the softening point of the plastic into which they are compounded. The expanding agents are preferably insoluble in the compounded plastic to be foamed. Volatile liquids which gasify on heating and which may be entrained in the polymer in order to effect its expansion may be either a single compound or a mixture of one or more organic liquids. Illustrative materials include polymer nonsolvents as such, e.g., petroleum ether as well as solvents, e.g., methanol, miscible with liquid nonsolvents in suitable proportions. Suitable additional organic liquids are such as benzene; chloroform; lower aliphatic ketones, ethers and esters; ethylene dichloride; methyl chloride; carbon tetrachloride and the like. Illustrative examples of solid blowing agents which decompose on heating to form a gas are such as N,N'-dimethyl - N,N' - dinitrosoterephthalamide; azobisformamide; ammonium carbonate; tertiary alkyl ammonium nitrites; e.g., tertiary butyl or hexyl ammonium nitrite; 1,3-diphenyltriazene; 1-benzenesulfonyl-3-betacyanoethyl-3-phenyltriazene; cuminylazide; p,p' - oxybis(benzene sulfonyl hydrazide); dinitrosopentamethylenetetramine; and disubstituted ammonium dithiophosphate.

The concentration of the expanding agent incorporated in the polymer should be between about 3% and 15% of the weight of the polymer and preferably from about 5 to about 9% by weight. If too large a quantity of expanding agent is used, the polymer may become gummy or porous and presents handling problems as well as an inferior product. Conversely, too little expanding agent will not provide adequate expansion and sintering or welding of the foamed shape into an integral unit may be precluded.

Suitable polymers which may be utilized according to the invention include any of the various synthetic thermoplastic materials such as polymers of the various vinyl aromatic compounds such as polystyrene, polymethylstyrene, polydimethylstyrene, polychlorostyrene and the like and copolymers of the corresponding monomers thereof with various compounds having a polymerizable $CH_2=C<$ group such as acrylonitrile, butadiene, ethyl acrylate, methyl methacrylate, ethyl methacrylate, and the like. When copolymers are employed, the vinyl aromatic proportion chemically combined in the copolymer should be at least 55% and preferably at least 65% with the other polymerizable monomer being present correspondingly in amounts of not more than 45% and preferably not more than 35%.

Various procedures may be adapted for preparing the bulky expandable material to be foamed. As illustrative methods of obtaining the high bulk low density expandable material, the polymer containing expanding agent may be extruded, for example, into thin walled star-shaped or spiral configurations. The bulky material may also be derived, for example, by proper adjustment of solution concentration of polymer and velocity of moving precipitating liquid stream according to the procedure of the heretofore noted pending application, Serial No. 737,759, filed May 26, 1958, now abandoned, to produce a stringy vermiform product of suitable bulk. The process involved in that pending application comprises dissolving a polymer in a suitable solvent and extruding the solution with a moving nonsolvent stream, which precipitates and fragments the precipitated polymer into discrete particles. Such adjustments in that system of preparing the expandable polymer should be made preferably so as to produce a material having a bulk density less than 12 pounds per cubic foot.

The invention will be more fully understood by reference to more specific embodiments of the invention as illustrated by the following examples. All proportions are by weight unless specifically noted otherwise.

*Example 1*

60 parts of polymethylstyrene were dissolved in 40 parts of an equal part mixture of petroleum ether and acrylonitrile. This solution was extruded into methanol whereupon a long, vermiform shape of expandable polymer precipitated. On drying this material assumed an excelsior-like shape with a bulk density of about 2.8 pounds per cubic foot. This bulk density is highly dependent on the pressure with which the particles are packed into the measuring device. As measured, the particles were introduced into the measuring device without packing or compressing.

A cylindrical mold perforated with 0.0156 inch diameter holes and 8.8 millimeters in diameter and 10 millimeters high was completely filled and somewhat packed with the above excelsior shaped material. The mold and contents were then heated for 4 minutes at 40 pounds per square inch steam. A molded cylindrical solid free from overlapping molds and of uniform density (5.1 pounds per cubic foot) was formed. Because of the uniform density, stress on the walls of the mold was close to the minimum which could possibly be exerted in molding a 5.1 pound per cubic foot object in this mold.

*Example 2 (Comparative)*

240 parts of methanol were mixed with 80 parts of petroleum ether of a boiling range from 30 to 60° C. Ground polymethylstyrene passing a U.S. No. 12 size sieve but retained by a No. 16 sieve was added in the proportion of 240 parts to 320 parts of liquid. The container of this mixture was tightly closed and agitated for 4 days at 20 to 25° C. The treated polymer was then strained from the liquid and dried to remove superficial volatile matter. 63 parts of the above expandable polymethylstyrene passing a No. 10 sieve and having a bulk density of 36 pounds per cubic foot was distributed uniformly over the bottom 3 inch by 8 inch area of a 2-inch deep mold cavity. The mold was closed and heated to 135° C. in an autoclave by steam which entered the mold cavity through holes 0.0156 inch in diameter. After holding 5 minutes then cooling, the molded piece was removed. Although it had an over-all density of about 5 pounds per cubic foot, it was marred by creases formed by the folding of the charge during its softening and expansion and with air pockets of substantial size in the cross section. The molded part varied in density from one cubic inch to the next and had, therefore, also exerted higher pressures on some areas of the mold wall. The bulk density of 12–16 U.S. sieve non-expanded polymethylstyrene containing entrained expanding agent as represented by the material employed in this example is 35.8 pounds per cubic foot and represents the density of material heretofore conventionally employed in preparing expandable polymer.

Example 3

Aluminum pigmented polymethylstyrene was extruded through a star-shaped die to form rods of a delicate star-shaped cross section 0.4 inch in diameter and weighing 0.086 gram per inch. These rods were soaked in a 60 to 40 part mixture of methanol to petroleum ether until they could be completely foamed up by dry heating.

One of the expandable rods was then inserted into a cylindrical retainer, 0.5 inch in diameter and 6 inches long. This apparatus was then heated to a temperature above the boiling point of petroleum ether and above the softening point of the expandable polymethylstyrene rod. The retainer was completely filled with foam of a uniform density of 3 pounds per cubic foot. The pressure of expansion had been uniform over the length of the retainer so that it was uniformly stressed.

Example 4

Pigment grade aluminum powder was blended with a polystyrene-styrene solution such as is present in a certain stage of bulk polymerization practice. The blend was treated under vacuum and heated to remove the styrene monomer, then extruded through die so as to produce a filament of 60 mils diameter. While still hot, the filament was wound on a 3/16 inch diameter rod, then cooled and chopped to provide a bulky mass of coiled fragments containing 90 parts of polystyrene and 10 parts of aluminum. This bulky material was soaked 12 hours in a solution containing 20 parts of petroleum ether in 80 parts of methanol. After superficial drying, this material had a bulk density of about 4 pounds per cubic foot. A rectangular mold cavity measuring 2 inches by 3 inches by 8 inches was filled with the expandable material and heated with steam for 30 seconds at 35 pounds per square inch gauge pressure. A molded shape of uniform density from cubic inch to cubic inch was formed.

Example 5

50 parts of polymethylstyrene were dissolved in 50 parts of acetone-ethyl acetate, 50–50. 5/10 parts of solid blowing agent (N,N'-dimethyl-N,N'-dinitrosoterephthalamide) was blended in and the blend knifed on glass plate 30 mils thick. When dried sufficiently for handling as a coherent film but while still soft, the film was cut into strips 3/8 inch wide and processed by twisting so as to form shapes substantially that of helical ribbons or screws. When completely dried, the ribbons were broken into short lengths and this bulky material (having a bulk density of 3.4 pounds per cubic foot) was charged into a mold with a rectangular cavity, 1 inch by 2 inches by 2 inches. This system was heated 10 minutes at 115° C., cooled and unloaded. An object of uniform condition, top to bottom, had been formed.

It will be apparent that my invention extends to various other modifications, the details of which are apparent to those skilled in the art, and do not constitute departures from the spirit and scope of my invention.

I claim:

1. A method of making a solid shaped mass of cellular structure from thermoplastic vinyl aromatic resinous polymers which contain incorporated therein from about 3% to about 15%, based on the weight of the polymer, of a volatile expanding agent having a gasifying temperature below the softening point of said polymer, by a single expansion step, which consists of completely filling a shaped apparatus with irregular shaped bulky, stringy, vermiform, nonexpanded discrete particles of said polymer, said nonexpanded particles having a bulk density not greater than that of the finished foamed shape and uncompressed, unexpanded bulk density not greater than 12 pounds per cubic foot, and heating the impregnated particles in said shaping apparatus at a temperature above the softening point of said impregnated polymer to effect expansion thereof and until the discrete particles expand into a cellular structure conforming to the contour of said shaping apparatus and are mutually sintered into an integral shaped solid cellular mass.

2. A method according to claim 1 wherein the thermoplastic vinyl aromatic resinous polymer is polystyrene.

3. A method according to claim 1 wherein the thermoplastic vinyl aromatic resinous polymer is polymethylstyrene.

4. A method according to claim 1 wherein the thermoplastic vinyl aromatic resinous polymer is a methylstyrene-acrylonitrile copolymer.

5. A method according to claim 1 wherein the thermoplastic vinyl aromatic resinous polymer is polymethyl styrene and the irregular shaped nonexpanded discrete particles of said polymethylstyrene are in the shape of excelsior.

References Cited in the file of this patent

UNITED STATES PATENTS

| | | |
|---|---|---|
| 2,744,291 | Stastny et al. | May 8, 1956 |
| 2,787,809 | Stastny | Apr. 9, 1957 |
| 2,857,340 | Colwell | Oct. 21, 1958 |
| 2,888,410 | Buchholz | May 26, 1959 |